United States Patent
Mylavarapu (10) Patent No.: US 10,915,256 B2
(45) Date of Patent: Feb. 9, 2021

(54) EFFICIENT MAPPING SCHEME WITH DETERMINISTIC POWER TRANSITION TIMES FOR FLASH STORAGE DEVICES

(71) Applicant: SK hynix Inc., Gyeonggi-do (KR)

(72) Inventor: Sai Krishna Mylavarapu, Santa Clara, CA (US)

(73) Assignee: SK hynix Inc., Gyeonggi-do (KR)

( * ) Notice: Subject to any disclaimer, the term of this patent is extended or adjusted under 35 U.S.C. 154(b) by 221 days.

(21) Appl. No.: 15/053,322

(22) Filed: Feb. 25, 2016

(65) Prior Publication Data

US 2016/0246530 A1    Aug. 25, 2016

Related U.S. Application Data

(60) Provisional application No. 62/120,666, filed on Feb. 25, 2015.

(51) Int. Cl.
| | |
|---|---|
| G06F 12/00 | (2006.01) |
| G06F 3/06 | (2006.01) |
| G06F 12/02 | (2006.01) |
| G06F 11/14 | (2006.01) |
| G06F 11/10 | (2006.01) |

(52) U.S. Cl.
CPC ............ *G06F 3/0625* (2013.01); *G06F 3/065* (2013.01); *G06F 3/0616* (2013.01); *G06F 3/0619* (2013.01); *G06F 3/0632* (2013.01); *G06F 3/0638* (2013.01); *G06F 3/0685* (2013.01); *G06F 3/0688* (2013.01); *G06F 11/1441* (2013.01); *G06F 12/0246* (2013.01); *G06F 11/1076* (2013.01); *G06F 11/1471* (2013.01); *G06F 2212/1016* (2013.01); *G06F 2212/1036* (2013.01); *G06F 2212/7201* (2013.01)

(58) Field of Classification Search
CPC ......... G06F 12/0246; G06F 2212/7201; G06F 3/0679; G06F 3/0659
See application file for complete search history.

(56) References Cited

U.S. PATENT DOCUMENTS

| | | | |
|---|---|---|---|
| 8,745,312 B2 | 6/2014 | Yun et al. | |
| 9,075,733 B1* | 7/2015 | Feldman | G06F 12/0292 |
| 2011/0093650 A1* | 4/2011 | Kwon | G06F 11/1441 |
| | | | 711/103 |
| 2013/0091320 A1* | 4/2013 | Kawamura | G06F 12/0246 |
| | | | 711/103 |
| 2014/0101369 A1* | 4/2014 | Tomlin | G06F 12/0246 |
| | | | 711/103 |

(Continued)

*Primary Examiner* — Arvind Talukdar
(74) *Attorney, Agent, or Firm* — IP & T Group LLP (57) ABSTRACT

A memory system may include a memory device and a controller. The memory device may include a plurality of storage areas. The controller may be suitable for processing data associated with at least one storage area among the plurality of storage areas of the memory device, and includes a logical to physical (L2P) table suitable for storing logical to physical (L2P) data, and a journal for storing update information indicating a change of logical to physical (L2P) information stored in the L2P table. The memory device may include a logical to physical (L2P) area corresponding to the L2P table of the controller such that, in the event of a power loss, the journal is written to the L2P area of the memory device and restored to the controller when power is restored.

16 Claims, 9 Drawing Sheets

(56) References Cited

U.S. PATENT DOCUMENTS

2014/0325117 A1* 10/2014 Canepa ............... G06F 12/0246
                                                        711/103
2015/0032972 A1*  1/2015 Sakthivelu .......... G06F 12/0804
                                                        711/143
2015/0186270 A1   7/2015 Peng et al.

* cited by examiner

EFFICIENT MAPPING SCHEME WITH DETERMINISTIC POWER TRANSITION TIMES FOR FLASH STORAGE DEVICES

CROSS-REFERENCE TO RELATED APPLICATIONS

This application claims the benefit of U.S. Provisional Application No. 62/120,666 filed Feb. 25, 2015, the entire contents of which are incorporated herein by reference.

BACKGROUND

1. Field

Exemplary embodiments of the present disclosure relate to a memory system including a memory device and a method for managing the memory device.

2. Description of the Related Art

A non-volatile storage medium such as flash memories are increasingly gaining applications in both enterprise and consumer data storage solutions. The flash memories are resilient to shock and their input/output (I/O) performance is better than that of conventional hard disk drives. Also, in contrast to the conventional hard disk drives, the flash memories are small in size and consume small power. However, due to the limited storage space, an improvement of memory management is required.

SUMMARY

Aspects of the invention include a memory device and a controller. The memory device may include a plurality of storage areas. The controller may be suitable for processing data associated with at least one storage area among the plurality of storage areas of the memory device, and includes a logical to physical (L2P) table suitable for storing logical to physical (L2P) data, and a journal for storing update information indicating a change of logical to physical (L2P) information stored in the L2P table. The memory device may include a logical to physical (L2P) area corresponding to the L2P table of the controller such that, in the event of a power loss, the journal is written to the L2P area of the memory device and restored to the controller when power is restored.

Further aspects of the invention include a method for operating a memory system. The method may include storing logical to physical (L2P) data in a L2P table of a controller, storing update information in a journal of the controller, the update information indicating a change of L2P stored in the L2P table, in the event of a power loss, writing the journal to an L2P area of a memory device that corresponds to the L2P table of the controller, and when power is restored, restoring the journal from the L2P area of the memory device to the controller

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being s u table for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
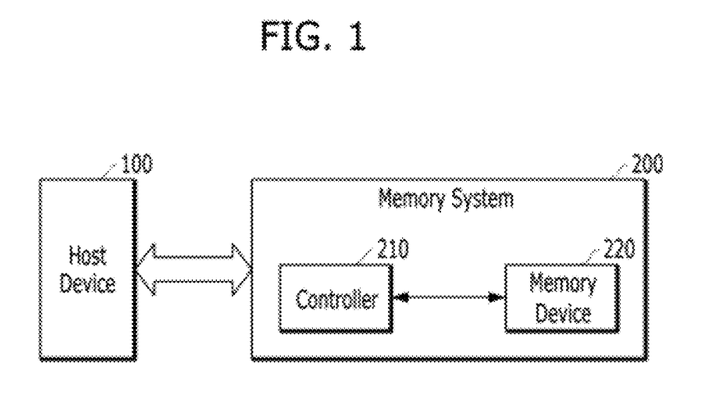
FIG. 1 is a block diagram of a data processing system.

FIG. 1 is a diagram illustrating a data processing system 10.

Referring to FIG. the data processing system 10 may include a host device 100 and a memory system 200.

The host device 100 may be implemented with any one of various kinds of electronic devices. In some embodiments, the host device 100 may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device 100 may include a portable electronic device such as a mobile phone, a smart phone, an e-book, an MP3 player, a portable multimedia player (PMP), and a portable game player.

The memory system 200 may operate in response to a request from the host device 100, and in particular, store data to be accessed by the host device 100. In some embodiments, the memory system 200 may be implemented with a storage device such as a solid state drive (SSD). In some embodiments, the memory system 200 may be implemented with any one of various kinds of storage devices such as a multimedia card (MMC) an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The memory system 200 may include a controller 210 and a memory device 220. The controller 210 may control storage of data in the memory device 220. The memory device 220 may store data to be accessed by the host device 100.

The memory device 220 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM), etc.

The controller 210 may control the memory device 220 in response to a request from the host device 100. The controller 210 may provide the data read from the memory device 220 to the host device 100, and store the data provided from the host device 100 into the memory device 220.

In some embodiments, the memory system 200 may configure a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

Figure 2:
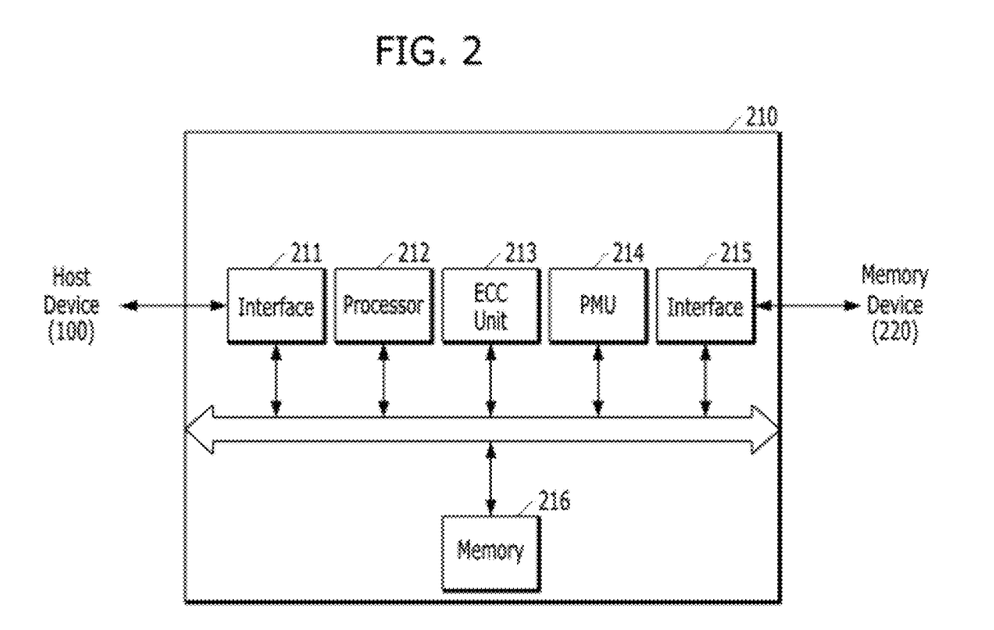
FIG. 2 is a block diagram of a controller for a memory system.

FIG. 2 is a block diagram for a controller 210 of a memory system 200 shown in FIG. 1.

Referring to FIG. 2, the controller 210 may include an interface 211, a processor 212, an error correction code (ECC) unit 213, a power management unit (PMU) 214, an interface 215 and a memory 216.

The interface 211 may process commands and data provided from the host device 100, and may communicate with the host device 100 through any one of various interface protocols. In some embodiments, the interface 211 may provide an interface between the memory system 200 and the host device 100 through a serial connection. For example, the interface 211 may provide the interface in accordance with an automation/drive interface transport (ADT) protocol.

The processor 212 may control general operations of the memory system 200 and a write operation or a read operation for the memory device 220 in response to a write request or a read request from the host device 100. The processor 212 may drive firmware, which is referred to as a flash translation layer (FTL), to control the general operations of the memory system 200. The processor 212 may be implemented with a microprocessor or a central processing unit (CPU). For example, the EFL may perform operations such as logical to physical (L2P) mapping, wear leveling, garbage collection, and bad block handling.

The ECC unit 213 may detect and correct errors in the data read from the memory device 220 during the read operation. The ECC unit 213 may not correct error bits when the number of the error bits is greater than or equal to a threshold number of correctable error bits, and may output an error correction fail signal indicating failure in correcting the error bits.

The ECC unit 213 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 213 may include all circuits, systems or devices for the error correction operation.

The PMU 214 may provide and manage power for the controller 210, that is, power for the component elements included in the controller 210.

The interface 215 may provide an interface between the controller 210 and the memory device 220 to allow the controller 210 to control the memory device 220 in response to a request from the host device 100. The interface 215 may generate control signals for the memory device 220 and process data under the control of the processor 212. When the memory device 220 is a flash memory such as a NAND flash memory, the interface 215 may generate control signals for the NAND flash memory 220 and process data under the control of the processor 212.

The memory 216 may serve as a working memory of the memory system 200 and the controller 210, and store data for driving the memory system 200 and the controller 210. The controller 210 may control the memory device 220 in response to a request from the host device 100. For example, the controller 210 may provide the data read from the memory device 220 to the host device 100 and store the data provided from the host device 100 in the memory device 220. When the controller 210 controls the operations of the memory device 220, the memory 216 may store data used by the controller 210 and the memory device 220 for such operations as read, write, program and erase operations.

The memory 216 may be implemented with volatile memory. The memory 216 may be implemented with a static random access memory (SRAM) or a dynamic random access memory (DRAM). As described above, the memory 216 may store data used by the host device 100 and the memory device 220 for the read and write operations. To store the data the memory 216 may include a program memory, a data memory, a write buffer, a read buffer, a map buffer, and so forth.

As mentioned above, the memory device 220 may be implemented with a flash memory such as a NAND flash memory (hereinafter NAND). Due to the physical characteristics of the NAND flash memory, data in a storage system (or a memory system) based on it has to be relocated from time to time, requiring an exchange between logical to physical (L2P) locations or addresses) of data. Also, the so called L2P map/table, which indicates mapping between a logical address from a host device 100 and a physical address of the memory device 220 in FIG. 1, needs to be persistently stored to the NAND so that across power cycles, this mapping can be reconstructed. For a good L2P mapping, some requirements may be considered as the following.

Fast Transition to Low Power States:

Flushing tables to the NAND might potentially be the longest operation after a power down (e.g., after a specific command to enter a low power mode or a surprise power loss). Typically, enterprise drives as the memory device 220 (or the storage) have limited charge in the capacitors (e.g., to support only few milliseconds) after power goes down. Therefore, the L2P mapping data structure should be optimized to consume the least amount of time possible to flush L2P information to the NAND at a low power state transition/surprise power loss.

Fast reconstruction after Power Up (i.e., time to drive ready):

Enterprise requirements for drive ready time after power up are typically very stringent For example, a typical requirement is under one second. This means L2P information is loaded (at least partially) before the drive becomes ready. Thus, it is important to have an optimized L2P data structure that minimizes L2P reconstruction time.

Minimal impact to run-time performance:

L2P Tables are flushed to the NAND from time to time. This results in overhead on a central processing unit (CPU) as well as on an input/output (I/O) circuit, resulting in lessened quality of service (QoS) to the host device. A good L2P structure will ensure the rest of the NAND management services are minimally impacted while handling this activity, thus ensuring a good QoS.

Reliability/Error Handling:

L2P tables, especially for large capacities, can be huge and hence programming the NAND with this data results in wear. A good technique will ensure minimal wear by writing enough to ensure integrity, but minimize total L2P data written. Another important aspect of L2P handling is error handling during L2P data accesses. A good technique will be robust with respect to different NAND errors and intrinsic defects (e.g., program, read and erase; bad blocks and catastrophic die failures) occurring at any given time, including an unexpected power loss. In addition, the volatile contents of L2P tables may themselves be protected with the error correction code (ECC) to offer end to end protection required by enterprise environments. In spite of all this, if information of the L2P table still cannot be reconstructed (e.g., either losing just a few entries or the entire table) the memory system should fail gracefully with appropriate error messages.

Scalability:

Capacities of SSD as the memory device are ever increasing and are expected to grow exponentially. A good technique will have deterministic and minimal scaling overhead.

Coherence:

There may be special cases such as TRIM handling which can overwhelm any system, especially under an expected loss of power. A good L2P scheme will address most, if not, all related considerations such as QoS (e.g., time limit before a TRIM returns), amount of free space generated, determinism (e.g., returning zeros vs. stale data consistently), and still result in a robust system by rebuilding L2P across power cycles coherently.

Described herein are embodiments of a robust and efficient. L2P handling mechanism that addresses each of the above requirements. Also, various techniques to determine various parameters to ensure determinism and various control flows will be described.

Figure 3:
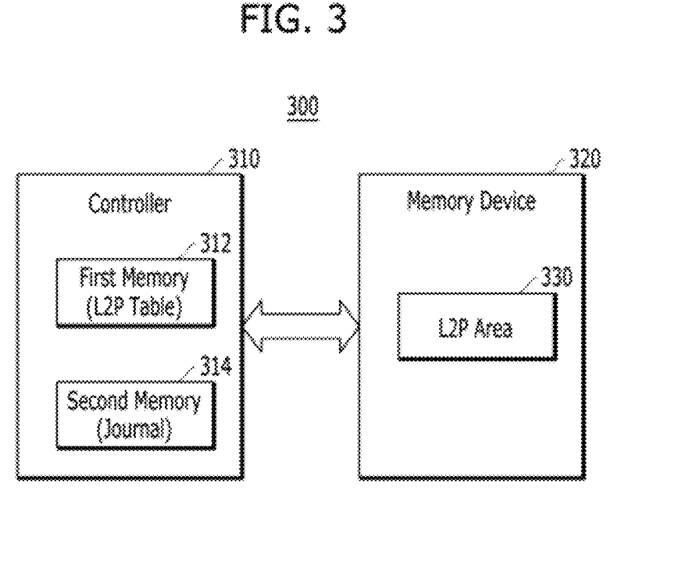
FIG. 3 is a block diagram of a memory system in accordance with embodiments of the present invention.

FIG. 3 is a block diagram of a memory system 300 including a controller 310 and a memory device 320 in accordance with the present invention. It should be noted that FIG. 3 only illustrates the memory system 300 in terms of a logical to physical (L2P) mapping of a flash translation layer performed in the memory system 300. Accordingly, the memory system 300, the controller 310, and the memory device 320 may be similar in construction and functionality as the memory system 200, the controller 210, and the memory device 220 respectively, as described with reference to FIGS. 1 and 2.

Referring to FIG. 3, the memory system 300 may include the controller 310 and the memory device 320. The memory device 320 may include a plurality of storage areas. For example, the memory device 320 includes a plurality of memory chips. Each of the memory chips may be divided into a plurality of dies, and each of the dies may be divided into a plurality of planes. Each of the planes may include a plurality of memory blocks, and each of the blocks includes a plurality of pages. A super block may include a predetermined number of blocks.

The controller 310 may process data associated with at least one storage area among the plurality of storage areas of the memory device 320. For example, the controller 310 processes (e.g., write, read, erase) data of the memory device 320 in response to a command from a host (not shown) (e.g., the host device 100 of FIG. 1). The controller 310 may include a first memory 312 and a second memory 314. In some embodiments, the first memory 312 includes a logical to physical (L2P) table, and a second memory 314 includes a journal. The first memory 312 may be a dynamic random access memory (DRAM), and the second memory 314 may be a static random access memory (SRAM) for faster updates and low power transition.

Figure 4:
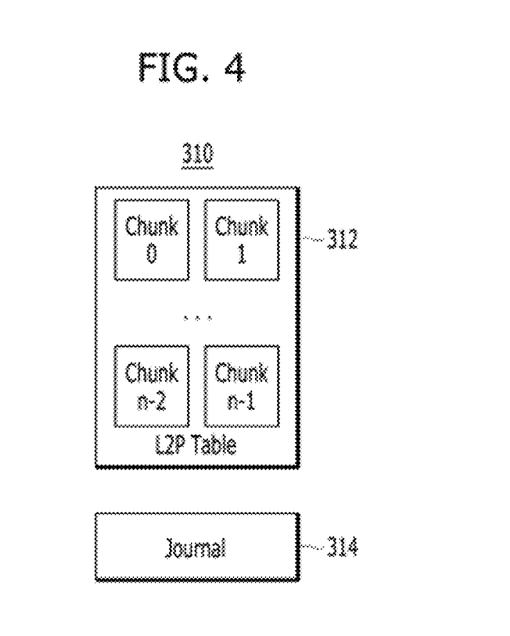
FIGS. 4, 5A and 5B are diagrams illustrating a logical to physical (L2P) data structure of a controller in accordance with embodiments of the present invention.

FIG. 4 is a diagram illustrating a logical to physical (L2P) data structure of a controller in accordance with the present invention.

Referring to FIG. 4, the L2P table of the first memory 312 may store logical to physical (L2P) data regarding mapping information between a series of logical addresses and a series of physical addresses for the plurality of storage areas of the memory device 320. In some embodiments, the L2P data may be divided into a plurality of chunks (e.g., chunk 0, chunk 1, . . . chunk n−2, chunk n−1). Each of the plurality of chunks may have a size determined based on a super page of the memory device.

Figure 5A:
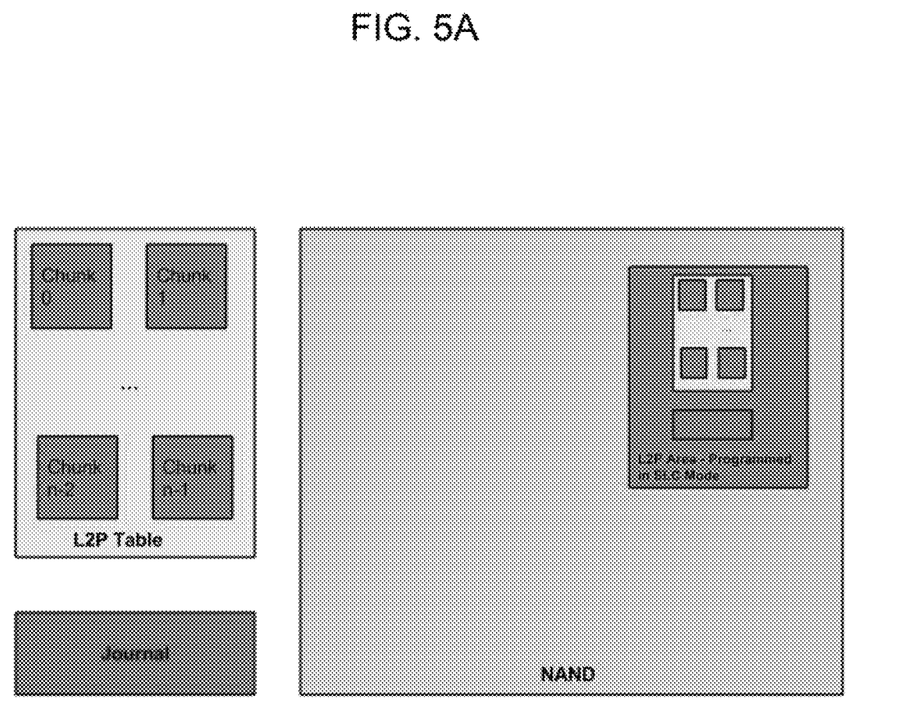

FIG. 5A illustrates examples of L2P data structures, including a journal, an L2P table, and an L2P area on the memory (shown here as NAND and programmed in SLC mode, although alternative memories and programming may be used as will be understood by one of skill in the art from the disclosure herein). In one example, a volatile L2P table may be kept in a DRAM and a journal may be kept in an SRAM for fast updates and to power transition. The size of the journal may be determined by capacitor budget. The sizes of the chunks may be determined by heuristics.

The journal of the second memory 314 may store update information indicating a change from a logical to physical (L2P) information stored in the L2P table at a predetermined time. In some embodiments, the journal may have a size determined based on one of an energy budget and a time budget of the memory device 320 available after accounting for other operations.

Figure 5B:
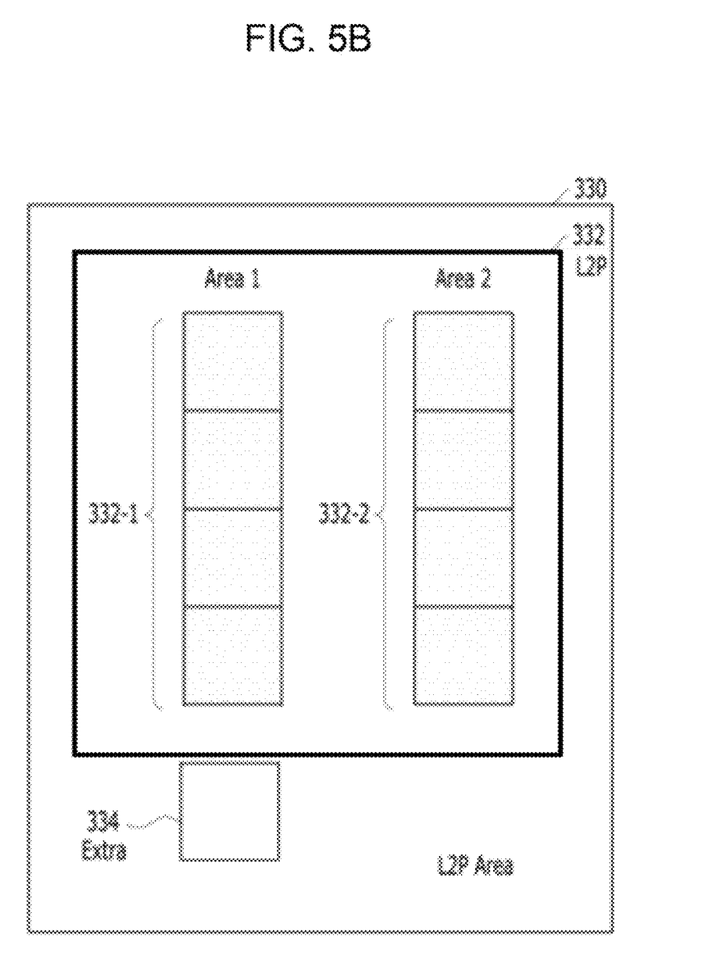

FIG. 5B is a diagram illustrating a logical to physical (L2P) area of a memory device n accordance with the present invention.

Referring to FIG. 5B, the memory device 320 may include a logical to physical (L2P) area 330 for storing a mapping table corresponding to the L2P table 312 of the controller 310. The L2P area 330 may include a dedicated area on the memory device 320 operated in a single level cell (SLC) mode, MLC mode, TLC mode, etc. The L2P area 330 may include an area 332 for the L2P data and an extra area 334 for over provisioning. In other words, the L2P area 330 may have a size determined based on a first size for the L2P data and a second size for over provisioning. The first size may be twice the size for the L2P data. In some embodiments, the area 332 may include a first area 332-1 and a second area 332-2. If the first area 332-1 is not full to accommodate the L2P data, the L2P data is stored in the first area 332-1. If the first area 332-1 is full, the L2P data is stored in the second area 332-2.

Now, with reference to FIGS. 3 to 5B various techniques to determine various parameters to ensure determinism and various control flows will be described.

Choosing the Persistent Locations on L2P Data

To optimize for reliability and speed, in some embodiments, all L2P data is kept in a dedicated location on the memory device 320 (e.g. NAND) operated only in the SLC mode. In some embodiments, twice the size of L2P data structure plus some over provisioning is required.

L2P Data Structure

The L2P data structure in FIGS. 4 to 5 is one embodiment of a data structure that minimizes the time it takes to transition to a low power state and that minimizes runtime impact.

(1) Journal of L2P updates since the last drop of L2P table to NAND:

By employing journaling (e.g., maintain only delta L2P changes from the last flush to the persistent memory 320), L2P information that needs to be flushed to the memory device 320 (e.g., a NAND) from time to time may be minimized as at the time of a sudden power loss, only the delta information (or update information) from the last drop needs to be flushed. In some embodiments, the journal 314 is kept in SRAM to facilitate quicker data transfers the memory device 320 for programming.

(2) Calculation of Journal's Size:

The size of the journal 314 may be directly calculated from the capacitor energy/time budget available after accounting for other operations (e.g., flushing in-fight data) as the following equation:

$$\text{Size of journal in NAND pages} = \text{Budget}/\text{TprogSLC}.$$

Once this is known, it may be possible to calculate the number of NAND pages required to hold the dirty information.

(3) Calculation of L2P Chunk Size:

The L2P data is divided into manageable chunks to reduce both run-time hits and low power transition. In some embodiments, a high reliability SLC area is used to hold L2P data to address both reliability as well as speed.

The size of the journal 314 determines the frequency at which the L2P table 312 must be flushed to the memory device 320. Once the journal 314 is full, all the dirty entries of the L2P table 312 are found out and flushed off to the memory device 320. Thus, the format and size of the L2P entries will be determined to ensure the L2P on the memory device never exceeds the number of blocks allocated, with runtime performance only minimally affected. Bigger chunks may mean higher QoS impacts, while smaller chunks may mean too frequent flushes and thus reduced reliability. For example, the host requests trail behind big L2P programs, and bigger chunks aggregate more dirty data over a period of time for the same amount of dirtiness.

The optimal chunk size may be determined by heuristics. For example, QoS may be the biggest determinant. In some embodiments, L2P chunk size may be set to a super page as the following equation:

$$\text{Size of L2P Chunk} = \text{super page arbitrary}).$$

One consideration in designing an L2P in the memory device 320 is how to deal with the situation when all blocks for L2P are full (i.e., the reclamation policy). If the allocated space is twice the size of L2P plus some over provisioning, every time one L2P section plus over provisioned area fills (e.g., L2P area 1 332-1 and the extra area 334 in FIG. 5) a fresh L2P drop needs to be done to new L2P section (e.g., L2P area 2 332-2) and old blocks reclaimed. In some embodiments, the size of the area for L2P in the memory device (e.g., NAND) 320 may be determined as the following equation:

$$\text{Size of SLC area on NAND allocated for} \\ \text{L2P} = 2 * \text{Size of L2P} + 20\% \text{ of L2P. Thus, the} \\ \text{above capacity should be reserved always for} \\ \text{L2P on the memory device 320.}$$

Bounding Recovery Time

It is needed to determine the worst case guaranteed time to restore the entire L2P information. If the dedicated blocks for L2P information in the memory device 320 is used, it is easy to bind this time (given it is guaranteed all the L2P information is contained within the dedicated blocks) as the following equation:

$$\text{Total recovery time} = \text{time for reading L2P} + \text{time to} \\ \text{read journal} + \text{time for potential error recovery} = \\ (\#\text{of super blocks in L2P} + \text{journal}) * \text{number of} \\ \text{dice per superblock}) * \#\text{SLC pages per block} * \\ (\text{Tread} + \text{Transfer})$$

For example, for a 480G SSD, assuming 2 superblocks per (L2P+journal), 32 dies per super block, 128 pages per block & 50 us Tread and 50 us Ttransfer, the recovery time would be around 800 ms, assuming zero errors given high reliability of SLC. Roughly, for a 12 TB SSD the recovery time would be about 10 sec.

It is possible to reduce the recovery time substantially if partial reconstruction (pull in L2P from memory on demand vs, all at once at power on) is allowed as described above. In other words, allowing the controller to selectively access (pulling in) L2Ps from the memory instead of accessing all the L2P at once after a power is advantageous as potentially nothing needs to be restored L2P wise after a power up.

Figure 6:
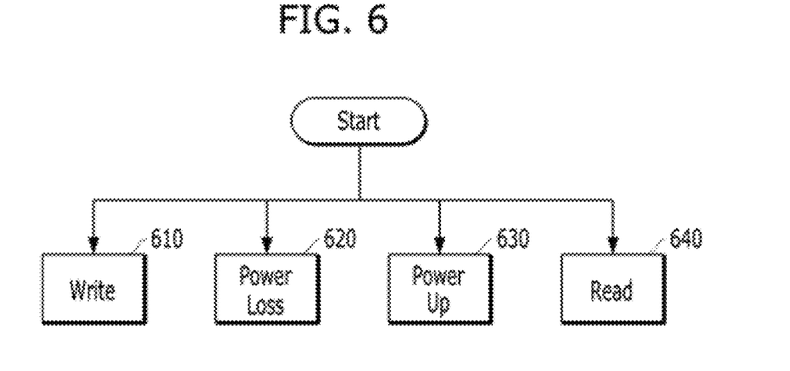
FIG. 6 is a diagram illustrating various operations in a memory system in accordance with embodiments of the present invention.

FIG. 6 is a diagram illustrating various operations in a memory system in accordance with the present invention. The operations may be performed by the memory system 300 including the controller 310 and the memory device 320 as shown in FIGS. 3 to 5B.

Referring to FIG. 6, various operations in the memory system 300 may include, but not limited to, a write operation 610, an operation 620 after a power loss, an operation 630 after a power up and a read operation 640.

Figure 7:
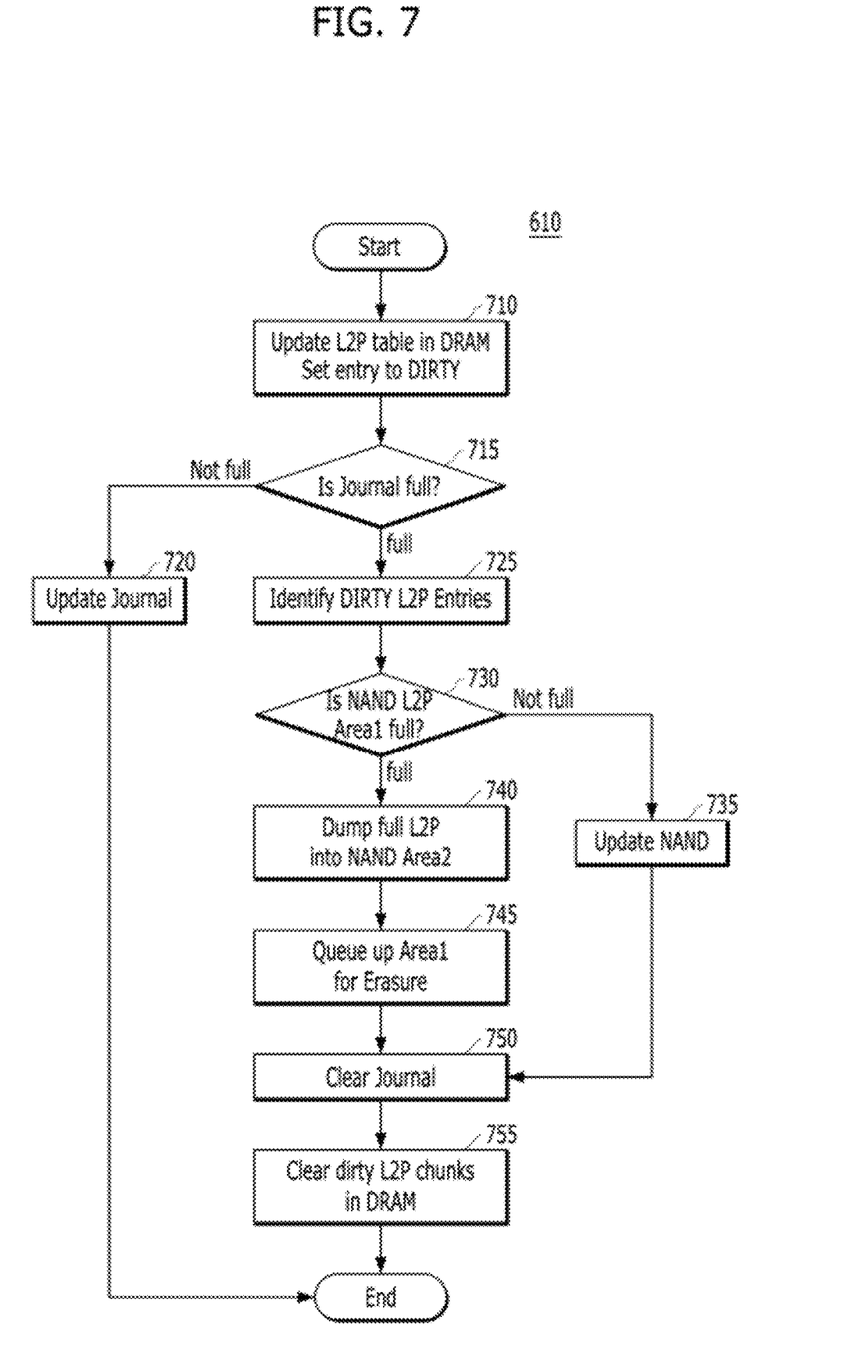
FIG. 7 is a flow chart illustrating a write operation in a memory system in accordance with embodiments of the present invention.

FIG. 7 is a flow chart illustrating a write operation 610 in a memory system in accordance with the present invention.

For example, the write operation 610 may be performed by the controller 310 of the memory system 300 as shown in FIGS. 3 to 5B.

Referring to FIG. 7, at the step 710, the controller 310 updates the L2P table 312 in DRAM, and sets entry of the L2P table 312 to DIRTY. Next, the controller 310 performs an operation for update of the journal 314.

At the step 715, the controller 310 checks whether the journal 314 is full. If the journal 314 is not full, at the step 720, the controller 310 updates the journal 314. If the journal 314 is full, the controller 310 proceeds to the step 725.

At the step 725, the controller 310 identifies DIRTY L2P entries of the L2P table 312. At the step 730, the controller 310 checks whether the L2P area 1 332-1 of the memory device 320 (e.g., NAND) is full. If the L2P area 1 332-1 is not full, at the step 735, the controller 310 updates the NAND 320 and proceeds to the step 750. If the L2P area 1 332-1 is full, the controller 310 proceeds to the step 740.

At the step 740, the controller 310 dumps full L2P information into the L2P area 2 332-2. At the step 745, the controller 310 queues up the L2P area 1 332-1 for erasure. At the step 750, the controller 310 dears the journal 314. At the step 755, the controller 310 dears dirty L2P chunks of the L2P table 312 in DRAM.

Figure 8:
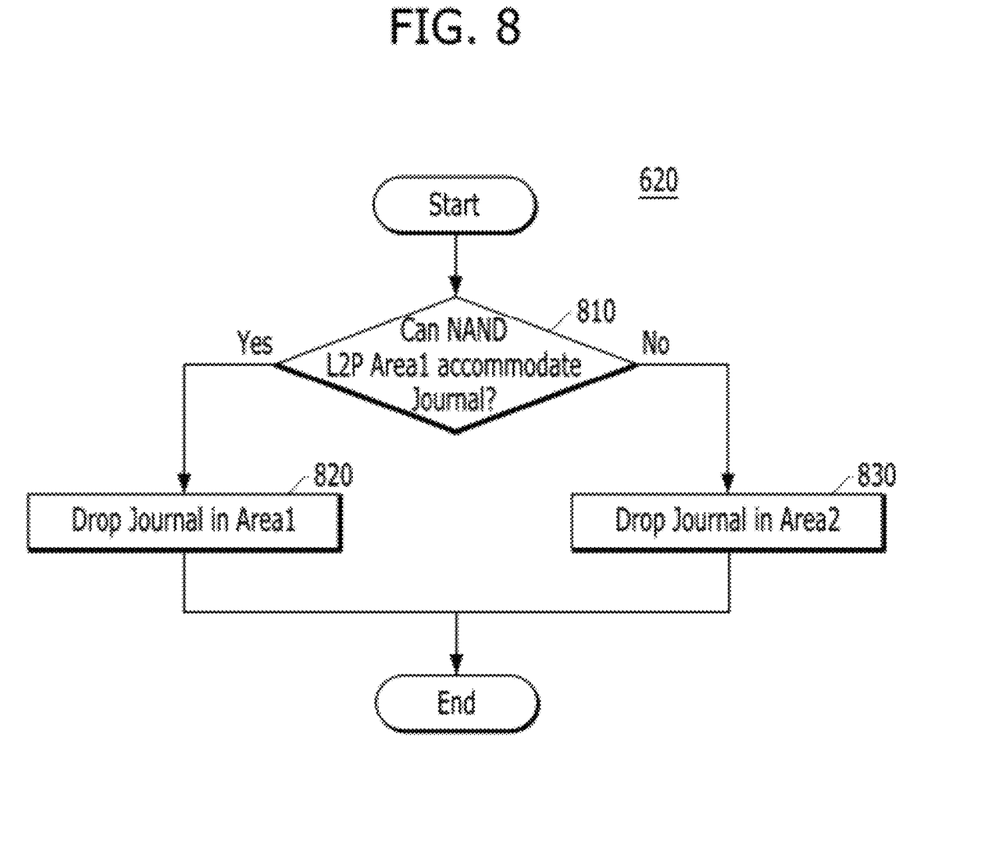
FIG. 8 is a flow chart illustrating an operation after a power loss in a memory system in accordance with embodiments of the present invention.

FIG. 8 is a flow chart illustrating an operation after a power loss (or a power down) 620 in a memory system in accordance with the present invention. For example, the operation 620 may be performed by the controller 310 of the memory system 300 as shown in FIGS. 3 to 5B.

Referring to FIG. 8, at the step 810, the controller 310 checks whether the L2P area 1 332-1 of the NAND 320 can accommodate the journal 314. If the L2P area 1 332-1 can accommodate the journal 314, at the step 820, the controller 310 drops the journal 314 in the L2P area 1 332-1. If the L2P area 1 332-1 cannot accommodate the journal 314, at the step 830, the controller 310 drops the journal 314 in the L2P area 2 332-2.

Figure 9:
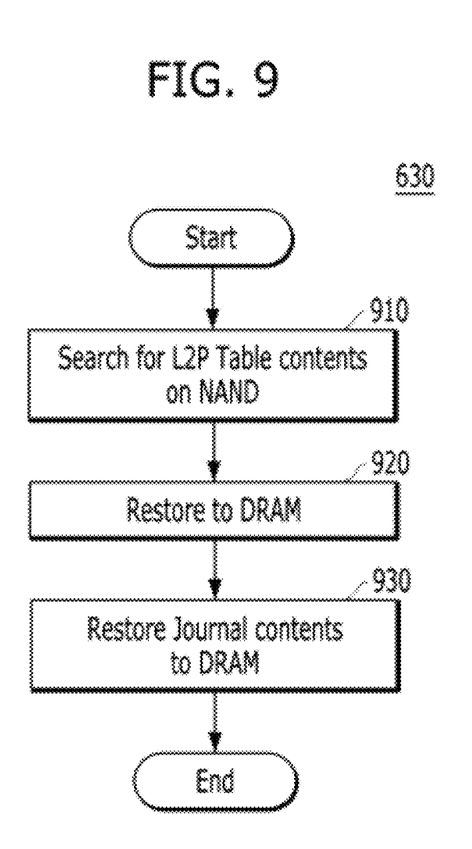
FIG. 9 is a flow chart illustrating an operation after a power up in a memory system in accordance with embodiments of the present invention.

FIG. 9 is a flow chart illustrating an operation 630 after a power up in a memory system in accordance with the present invention. For example, the operation 630 may be performed by the controller 310 of the memory system 300 as shown in FIGS. 3 to 5.

Referring to FIG. 9, at the step 910, the controller 310 searches for contents of the L2P table on the NAND 320. At the step 920, the controller 310 restores contents of the L2P table to the DRAM 312. At the step 930, the controller 10 restores contents of the journal if any to the DRAM 312.

Figure 10:
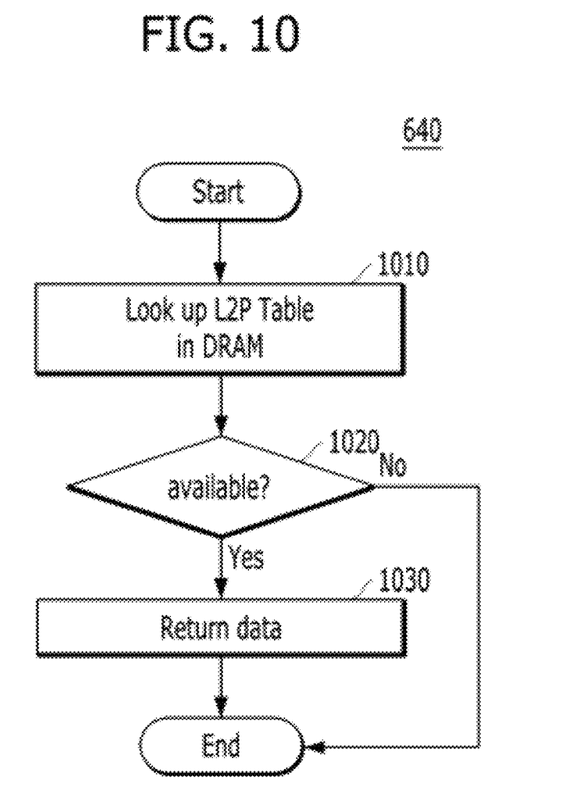
FIG. 10 is a flow chart illustrating a read operation in a memory system in accordance with embodiment of the present invention.

FIG. 10 is a flow chart illustrating a read operation 640 in a memory system in accordance with the present invention. For example, the read operation 540 may be performed by the controller 310 of the memory system 300 as shown in FIGS. 3 to 5B.

Referring to FIG. 10, at the step 1010, the controller 310 looks up the L2P table 312 in the DRAM for NAND location. At the steps 1020 and 1030, the controller 310 returns data if available.

Currently, reducing sudden power outage recovery (SPQR) times is of significant interest in order to enter into the enterprise market. Since this technique guarantees a maximum bound on L2P reconstruction times, and L2P handling happens to be most significant component of drive ready time, employing this technique increase enterprise performance. Furthermore, the technique is scalable and simple.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   a memory device including a plurality of storage areas; and
   a controller configured to process data associated with at least one storage area among the plurality of storage areas of the memory device,
   wherein the controller includes:
      a logical to physical (L2P) table configured to store logical to physical (L2P) data, the L2P data being stored as a plurality of chunks, each having a set size that is determined based at least in part on quality of service of the system and flush frequency of the L2P table, and
      a journal configured to store only update information indicating a change from logical to physical (L2P) information stored in the L2P table since a last flush operation to the memory device, wherein the journal has a size determined by a capacitor budget, which is indicative of charge of capacitors of the memory device, and is based on a memory cell programming time,
   wherein the memory device includes a logical to physical (L2P) area corresponding to the L2P table of the controller such that, in the event of a power loss, the journal is written to the L2P area of the memory device and restored to the controller when power is restored,
   wherein, when power is restored, the L2P information is recovered by selectively accessing only a portion of the L2P information based on demand, the portion of the L2P information being less than all of the L2P information, a total recovery time of which is based on data reading times and an error recovery time, and
   wherein quality of service of the system includes a time before TRIM handling of the memory system becomes available when power is restored.

2. The system of claim 1, wherein the L2P area includes a dedicated area on the memory device operated in a single level cell (SLC) mode.

3. The system of claim 2, wherein the L2P area has a size determined based on a first size for the L2P data and a second size for over provisioning.

4. The system of claim 3, wherein the first size includes twice the size for the L2P data.

5. The system of claim 1, wherein each of the plurality of chunks has a size that is also determined based on a super page of the memory device.

6. The system of claim 1, wherein the L2P table is included in a dynamic random access memory (DRAM), and the journal is included in a static random access memory (SRAM).

7. A method for operating a memory system, comprising:
   storing logical to physical (L2P) data in a L2P table of a controller, the L2P data being stored as a plurality of chunks, each having a set size that is determined based at least in part on quality of service of the system and flush frequency of the L2P table,
   storing only update information in a journal of the controller, the update information indicating a change of L2P stored in the L2P table since a last flush operation to the memory device,
   in the event of a power loss, writing the journal to an L2P area of a memory device that corresponds to the L2P table of the controller, wherein the journal has a size determined by a capacitor budget, which is indicative of charge of capacitors of the memory device, and is based on a memory cell programming time, and when power is restored, restoring the journal from the L2P area of the memory device to the controller and recovering the L2P data by selectively accessing only a portion of the L2P data based on demand, the portion of the L2P information being less than all of the L2P information, a total recovery time of which is based on data reading times and an error recovery time, wherein quality of service of the system includes a time before TRIM handling of the memory system becomes available when power is restored.

8. The method of claim 7, wherein the L2P area includes a dedicated area on the memory device operated in a single level cell (SLC) mode.

9. The method of claim 8, wherein the L2P area has a size determined based on a first size for the L2P data and a second size for over provisioning.

10. The method of claim 9, wherein the first size includes twice the size for the L2P data.

11. The method of claim 7, wherein each of the plurality of chunks has a size that is also determined based on a super page of the memory device.

12. The method of claim 7, wherein the L2P table is included in a dynamic random access memory (DRAM), and the journal is included in a static random access memory (SRAM).

13. The system of claim 1, wherein a bounded recovery time of the L2P information is based on a time for reading the L2P information and a time for reading the journal.

14. The method of claim 7, wherein a bounded recovery time of the L2P information is based on a time for reading the L2P information and a time for reading the journal.

15. The system of claim 1, wherein the total recovery time is based on a storage capacity of the plurality of storage areas and the data reading times includes a reading time and a transfer time of data between the memory device and the controller.

16. The method of claim 7, wherein the total recovery time is based on a storage capacity of the memory device and the data reading times includes a reading time and a transfer time of data between the memory device and the controller.

* * * * *